United States Patent [19]
Schmidt

[11] Patent Number: 4,530,584
[45] Date of Patent: * Jul. 23, 1985

[54] CAMERA SUPPORT

[76] Inventor: John D. Schmidt, 1634 Overbrook Rd., Englewood, Fla. 33533

[*] Notice: The portion of the term of this patent subsequent to Jan. 29, 2002 has been disclaimed.

[21] Appl. No.: 462,808

[22] Filed: Feb. 2, 1983

Related U.S. Application Data

[63] Continuation-in-part of Ser. No. 426,262, Sep. 29, 1982, Pat. No. 4,496,288.

[51] Int. Cl.³ .............................................. G03B 17/00
[52] U.S. Cl. .................................................. 354/293
[58] Field of Search ........................... 354/81, 82, 293; 248/121, 122, 124, 125, 205 R, 161, 411, 412

[56] References Cited

U.S. PATENT DOCUMENTS

| 2,806,416 | 9/1957 | Jones | 354/82 X |
| 3,269,681 | 8/1966 | Azim | 248/124 X |
| 3,289,563 | 12/1966 | Kent | 354/293 |
| 3,533,583 | 10/1970 | Azim | 248/125 |
| 3,575,098 | 4/1971 | Jones | 354/293 |
| 4,051,493 | 9/1977 | Nakagawa et al. | 354/293 X |
| 4,081,814 | 3/1978 | Bulland | 354/82 X |
| 4,255,036 | 3/1981 | Pincetich | 354/293 |

OTHER PUBLICATIONS

Holzman et al., *How to use & Select Photographic Gadgets,* H. P. Books, Tucson, AZ, 1980, pp. 28 & 31.

*Primary Examiner*—John Gonzales
*Attorney, Agent, or Firm*—Hauke & Patalidis

[57] ABSTRACT

In one embodiment of the invention, a first elongate member is slidably associated with a second elongate member, and the second member is extendable relative to the first member. The second elongate member is arrestable and securable in various positions relative to the first member.

An angle-shaped camera support has tubular members attached to each leg of the support, and selectively each tubular member slidably receives the second elongate member. A camera is mountable on one leg of the support and may be releasably arrested and as desired secured releasably in various locations on the second elongate member.

In another embodiment of the invention, a main body portion has an extending arm to which is pivotably mounted a camera support shelf. The main body portion is slidable upon the second elongate member, and it is releasably arrestable and securable as desired in various positions on the second elongate member.

The camera shelf is pivotable from a first horizontal format picture taking position to a second vertical format picture taking position, and a detent holds the shelf in the first position.

Supports are provided for mounting an electronic flash gun to the camera supporting brackets.

19 Claims, 19 Drawing Figures

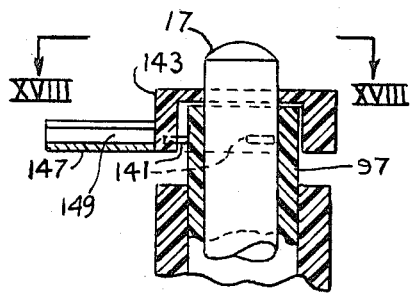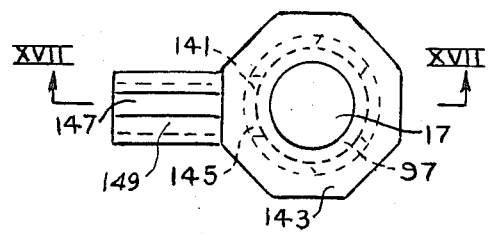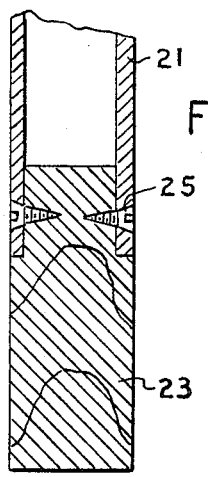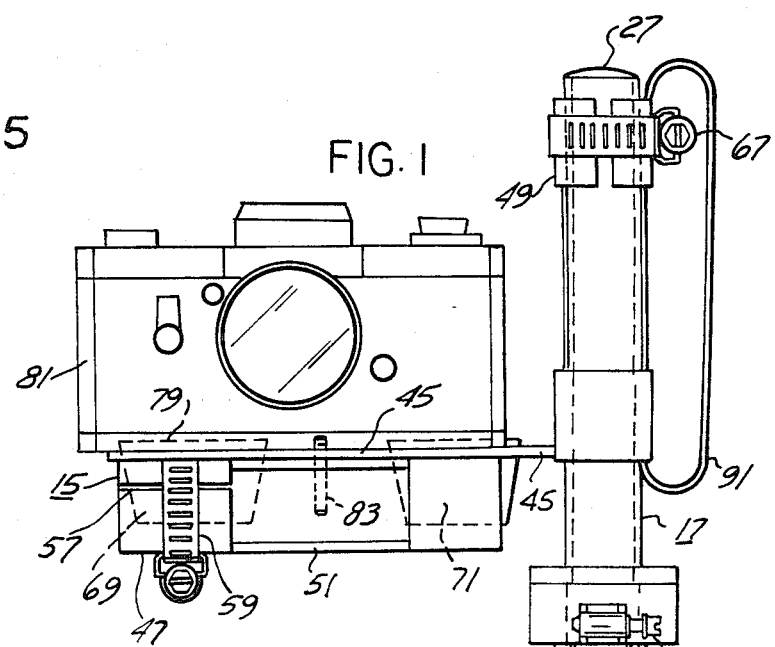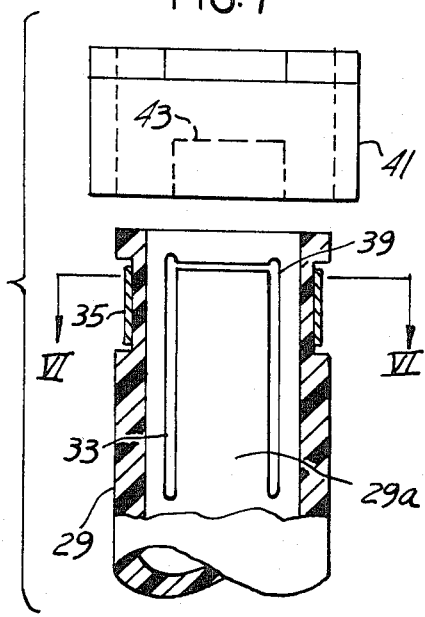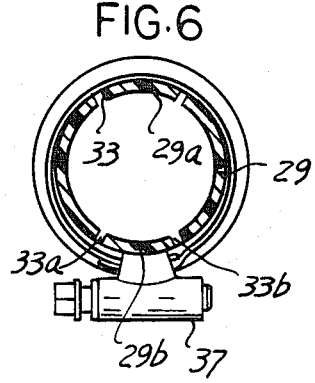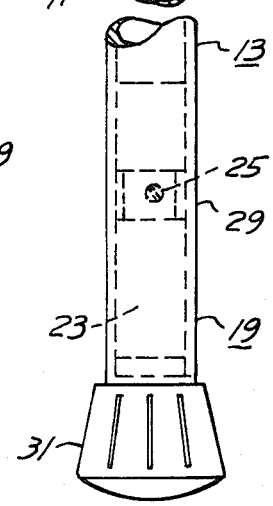

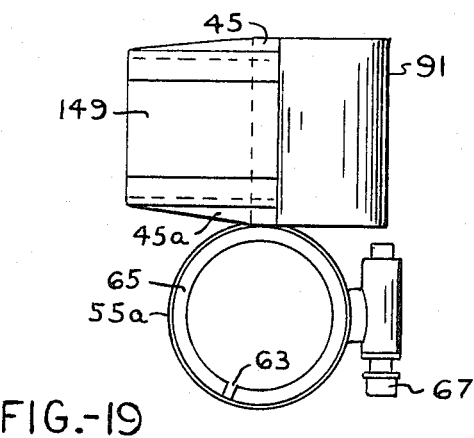
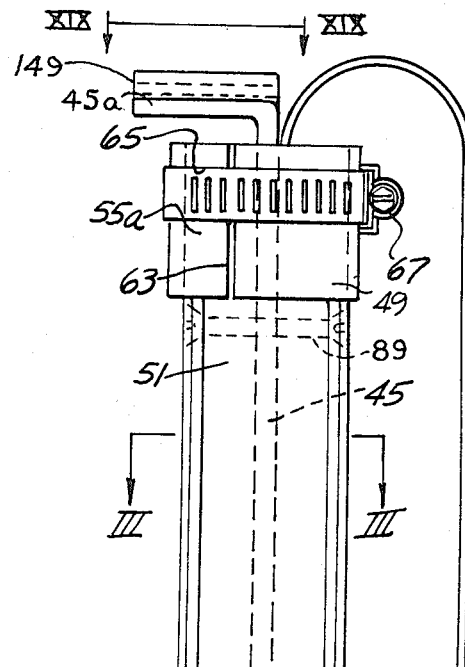
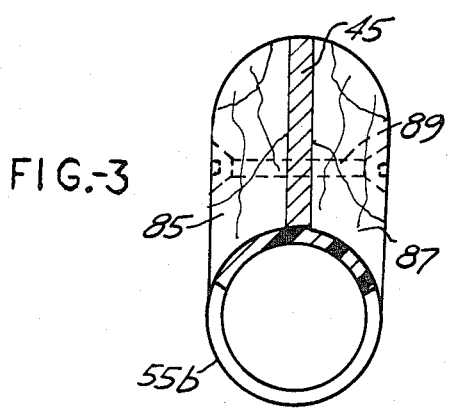
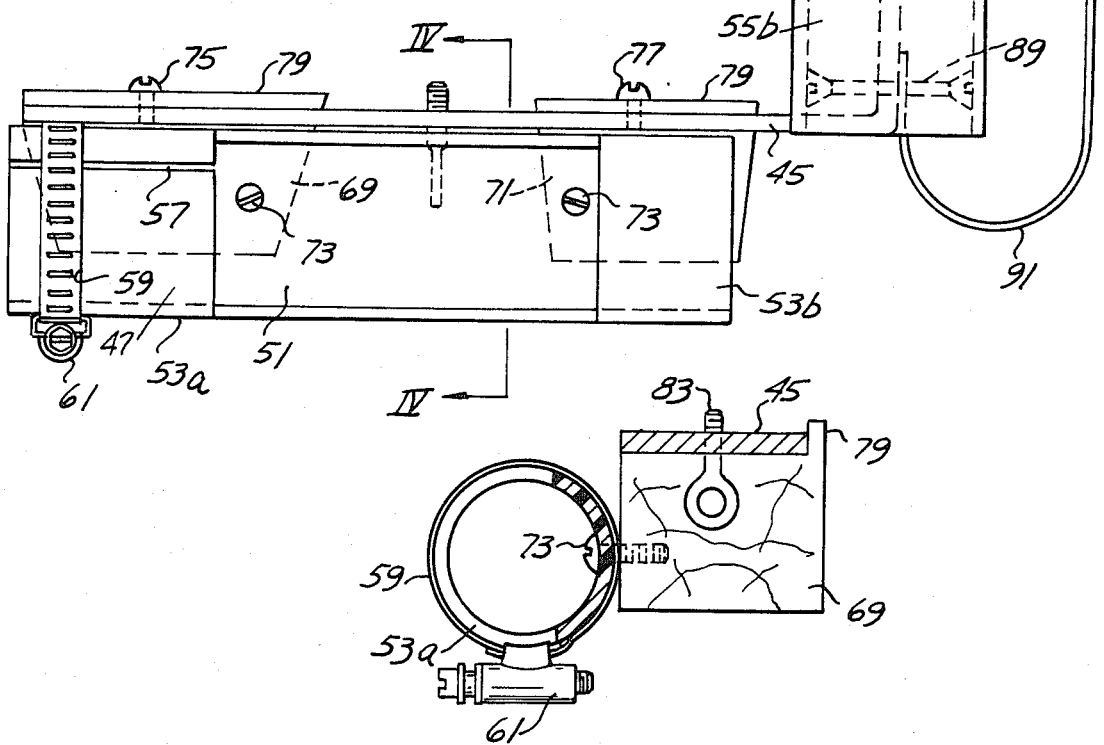

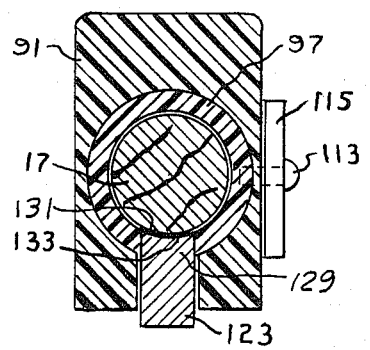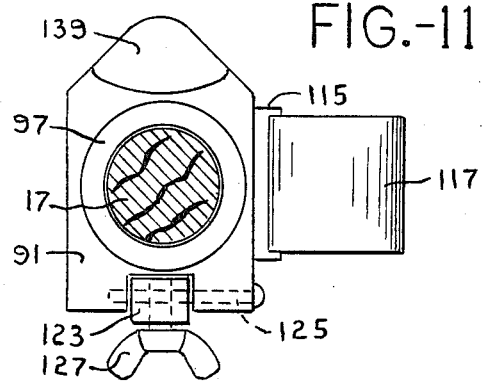
FIG.-10  FIG.-11
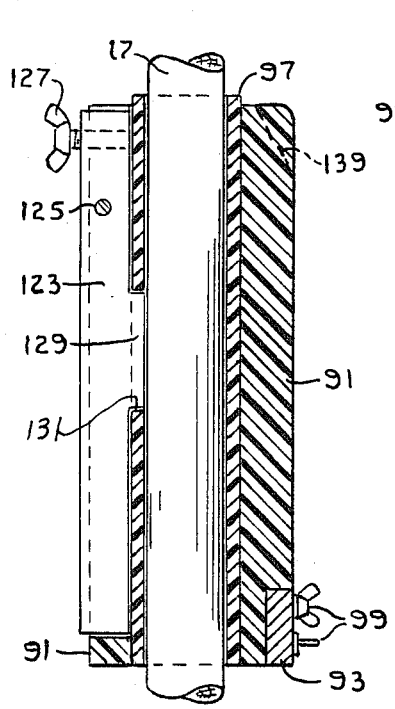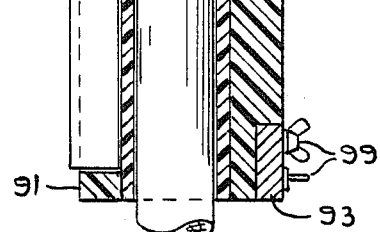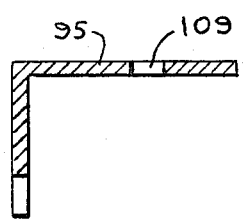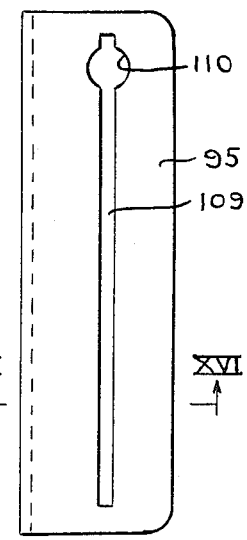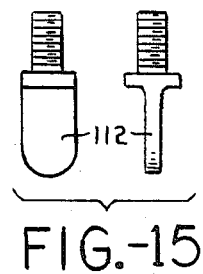
FIG.-13  FIG.-12  FIG.-16  FIG.-14  FIG.-15

CAMERA SUPPORT

CROSS REFERENCE TO RELATED APPLICATION

This application is a continuation-in-part of application Ser. No. 426,262, filed Sept. 29, 1982, now U.S. Pat. No. 4,496,288.

BACKGROUND OF THE INVENTION

The present invention relates generally to photography and, more particularly, to extensible supports for cameras.

For many years, photographers relied on the conventional tripod to support their cameras, both in the studio and in the field. That was when camera film was too slow to allow the use of fast shutter speeds, and also when the lenses used were not like the fast lenses that are available today. So, a rigid camera support was essential to every photographer's needs and the tripod provided that support.

Today, however, with camera film speeds approaching ASA 1000 and with the very fast lenses available, the cumbersome tripod is no longer necessary for supporting hand-held 35 mm cameras that are fitted with fast lenses. Yet, when a photographer uses a 35 mm camera equipped with a long telephoto or a zoom lens of 35-200 mm, 50-300 mm, and 100-600 mm focal length, it becomes necessary to have some camera support. Using a tripod to support cameras fitted with such lenses is in many instances not convenient and practicable. Where the subject matter moves rapidly and where a macro lens is fitted to the camera, a tripod can be very inconvenient to use.

The prior art is replete with camera supports of various types; one such type having a neck strap and one or more rigid legs that join a camera support. Another type includes a single leg with a camera mount and a connection to a belt worn about the photographer's waist. Another form of camera support is a long telescopic tube with camera mounted on one end. Yet, another type comprises a cart and step ladder.

Clearly, such types of camera support devices have limited adaptability in many instances when a photographer uses a camera fitted with lenses like those mentioned previously. When photographing wild life such as animals or birds, a camera support of the type described in the prior art is not very satisfactory and cannot be adapted to the different conditions experienced when photographing such subject matter.

Some of the camera supports known from the prior art are represented by U.S. Pat. No. 2,703,691 to Minnis which discloses a camera support comprising a frame and a swingable camera post mounted adjacent one end of the frame. A leg member is telescopable and extensible from the other end. An actuating arm is pivotably mounted to the post. Means is provided within the post, actuated by a lever portion to hold the swingable camera post in a selected angular position relative to the frame. Another prior art device is known from United Kingdom Specification No. 687,588 which discloses a supporting device for a camera comprising two parts, one part being formed by a telescoping support or tube provided with a clamping device for securing its elements in a selected relative position, the other being formed by a handle provided with element members cooperating with an element of the support for being secured in a removable manner to the latter in at least two different positions. The handle also includes an element that cooperates with the camera for securing it to the handle. Another prior art patent U.S. Pat. No. 3,289,563 to Kent, discloses a support for a camera and a flash gun comprising a telescopic tubular support to which is adjustably mounted a bracket. The bracket is adapted to support a camera in an operative position, and the bracket may be moved upwards or downwards on the tubular support or boom. The tubular support or boom also carries a support mount for the conventional flash gun or strobe light.

In contrast to the aforementioned prior art, the camera support of the present invention has many features and advantages thereover that will be apparent to one skilled in the art from the following description and the drawings.

SUMMARY OF THE INVENTION

A camera support, in accordance with one embodiment of the present invention, includes an angle-shaped base with means thereon for supporting a camera. The angle-shaped base is releasably mounted to an extendable telescopic tubular leg member with means for securing both the angle-shaped base and the extendable leg member in selectable positions.

Another embodiment of the present invention includes an arm extending outwardly from a sleeve slidably carried on the extendable telescopic tubular leg member, to which is pivotably mounted a platform supporting a camera. Means is provided for securing the sleeve in selected positions on the leg member and for pivoting the platform with camera attached from a horizontal format picture taking position to a vertical format picture taking position.

For a further understanding of the invention and for features and advantages thereof, reference may be made to the following description and to the drawings.

BRIEF DESCRIPTION OF THE DRAWINGS

In the drawings:

FIG. 1 is a schematic view of a camera support in accordance with one embodiment of the invention;

FIG. 2 is a schematic view in elevation of the camera support bracket portion of the apparatus of FIG. 1;

FIG. 3 is a view along the line III—III of FIG. 2;

FIG. 4 is a view along line IV—IV of FIG. 2;

FIG. 5 is a view of a portion of the apparatus of FIG. 1;

FIG. 6 is a view along line VI—VI of FIG. 7;

FIG. 7 is a view of a portion of the lower end of the support of FIG. 1;

FIG. 10 is a view along line X—X of FIG. 8;

FIG. 11 is a view along the line XI—XI of FIG. 8;

FIG. 12 is a view along line XII—XII of FIG. 8;

FIG. 13 is a view along line XIII—XIII of FIG. 8;

FIG. 14 is a view along line XIV—XIV of FIG. 8;

FIG. 15 is a view of a camera holding screw;

FIG. 16 is a view along line XVI—XVI of FIG. 14;

FIG. 17 is a sectional view of a support for a flash gun attached to the camera support of FIGS. 8 and 9;

FIG. 18 is a plan view of the flash gun support of FIG. 17; and

FIG. 19 is a view along line XIX—XIX of FIG. 2.

DETAILED DESCRIPTION

Figure 8:
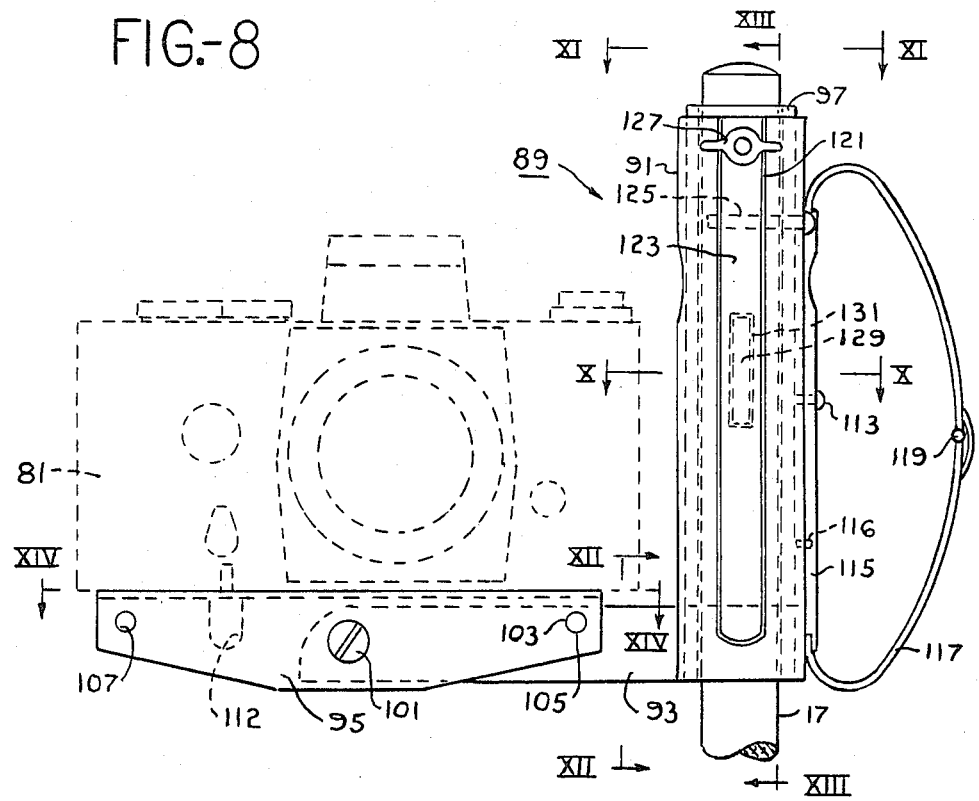
FIG. 8 is a schematic view of another embodiment of the camera support of the present invention shown in one operative position.

Referring to FIG. 1, a camera support 11 of the present invention comprises two portions, one being a telescoping shaft or leg 13 and the other being a camera mounting bracket 15 releasably mounted to the telescoping shaft or leg 13.

The telescoping shaft or leg 13 includes an upper slide section 17 and a lower base section 19. The upper slide section 17 is an elongate member, preferably a hollow tubular member 21, but in some instances it may be an elongate solid wooden or plastic rod. The lower end portion of the member 21, when tubular, is fitted with a wooden or plastic insert 23 which is held in place by means of conventional fasteners 25. The insert member 23 is made about eight or ten inches long for a purpose that will be disclosed hereinafter. The top end of the member 21, when tubular, is plugged as at 27 in FIG. 1, in any suitable manner.

The lower base section 19 is, preferably, a hollow plastic tubular section 29, to the bottom of which is fitted a conventional rubber cane tip 31. The upper end of the base section 19 is slotted longitudinally (FIG. 7) preferably in four places 33. The tubular plastic member 29 at the slotted end is also grooved peripherally, as at 35, to receive the band portion of a conventional screw-type hose clamp 37. Between the slots 33a and 33b, as shown in FIG. 6, the tubular member 29 is cut at the top of the groove 35, as at 39, thereby making each diametrically opposed portion of the plastic member 29a, 29b respectively, bendable inwardly toward the upper slide section 17, when it is inserted into the base section 19, and when pressure is applied to it by the screw-type calmp 37.

FIG. 7 also shows a collar 41 that is adapted to fit slidably down over the upper slotted end of the plastic member 29. A slot 43 in the collar 41 is provided to fit around a portion of the screw-type hose clamp 37.

Referring to FIGS. 1-4, the camera mounting bracket 15 of the present invention includes an angle-shaped base member 45 to which is fitted guide tubes 47, 49. One tube 47 is fitted to one leg of the angle-shaped base member 45, and the other tube 49 is fitted to the other leg of the base member 45.

The guide tube members 47, 49 are each sized to slidably receive the upper slide section 17, as shown in FIG. 1. The shell of the guide tube 47 is partly cut away longitudinally, as at 51, thereby forming two short tubular portions 53a, 53b connected together by the portion of the shell not cut away. In like manner, the shell of the guide tube 49 is partly cut away, as at 51, forming thereby two short guide tubular portions 55a, 55b connected together by the shell portion not cut away.

The guide tube 47, 49 are purposely cut away so as to afford finger contact with the upper slide section 17, when a photographer grasps the mounting bracket with his hand. That is, when the camera and the mounting bracket 15 are raised to a selected position on the upper slide section 17, finger contact with the upper slide section 17 will hold the bracket and camera in that position long enough for the photographer to take a picture. Then the bracket and camera can be slidably raised or lowered to another position on the upper slide section 17, and held in that position by finger contact with the upper slide section.

As shown in FIG. 2, the tubular portion 53a is slotted, as at 57, and is grooved peripherally, as at 59, to receive the band portion of a screw-type hose clamp 61. In like manner, the tubular portion 55a is provided with a slot 63 and the periphery is grooved at 65 to receive the band portion of a screw-type hose clamp 67.

As shown in FIGS. 2 and 4, the horizontal leg of the angle-shaped base member 45 is fitted with two shaped members 69, 71, that are connected to the tube member 47 by suitable fasteners 73. Each shaped member 69, 71 is also secured to the horizontal leg portion of the member 45 by means of suitable fasteners 75, 77 respectively. The members 69, 71 are made of wood in one embodiment of the invention, but they may be made of any other suitable material as desired. Each member 69, 71 is provided with an upstanding lip portion 79 that engages the back of a camera body 81 mounted on the bracket 15 to prevent the camera body from twisting around relative to the base member 45 once the camera is secured to the member 45 by a conventional mounting screw 83.

Referring now to FIG. 3, the upstandingleg of the angle-shaped base member 45 is fitted with a hand grip comprising two members 85, 87, shaped about as shown in FIG. 3. The two members 85, 87 are disposed one on each side of the upstanding leg of the base member 45. In one embodiment of the invention, the two members 85, 87 are made of wood, but each member may be made of other suitable materials as desired. The two members 87, 89 are fastened to the base leg by means of conventional fasteners 89. A leather or plastic strap, shaped as a loop 91, is also secured to the top and bottom end portions of the upstanding leg of the base 45, particularly to the shaped member 87, by means of the fasteners 89.

In use, a photographer first mounts the camera to the support bracket 15, threading the screw 83 into the conventional threaded hole in the bottom of the camera body 81. Then, after extending the upper slide section 17 to a desired length and securing it by tightening the screw-type hose clamp 37, the photographer mounts the bracket 15 on the upper slide section 17 by passing the upper end thereof through the tubular members 53a, 53b for a vertical format picture, and through tubular members 55a, 55b for a horizontal format picture, as shown in FIG. 1.

The photographer slides his left hand, if he is a right handed person, through the loop of strap 91 and grasps the hand grip 85, 97 with his fingers contacting the upper slide section 17. Then, the camera and the mounting bracket 15 may be moved up or down on the slide section 17 the photographer's fingers exerting pressure on the upper slide section 17 to hold the bracket and camera in any desired position therealong. While the camera bracket is held in the desired position by finger contact with the slide section, the photographer's right hand can manipulate the camera mechanism and release the shutter control.

The bottom tip 31 may be set upon the ground or other support surface and the camera support 11 may be manipulated through an infinite number of angles relative to a vertical through the tip contact point with the ground or other supporting surface.

Arresting means is provided to releasably secure the mounting bracket 15 in any selected position on the upper slide section 17 by means of the screw-type hose clamps 61, 67. It is a simple matter to reposition the bracket by releasing the screw-type clamps and moving the support bracket and camera to another position whereat the clamps may be tightened again.

As the upper slide section 17 is being extended, it may be extended too far and withdrawn completely from the lower base section. To prevent this, the photographer is alerted when the wooden bottom portion of the slide section appears above the top of the base member 19. The photographer then knows that the upper slide section 17 may be withdrawn only a few more inches, about eight or ten say depending on the length of the wooden portion 23. Those skilled in the art will recognize that other form of indicia may be provided to alert the photographer when the upper slide section is being withdrawn too far.

In some instances, the upper slide section 17 may be used independently of the lower base section 19, as when photographing flowers or insects at ground level.

In other instances, the upper slide section may be fully extended and the camera bracket mounted thereon upside down. Then, using a conventional cable release, the shutter may be released and a picture taken with the camera well above the photographer's head.

FIGS. 8-16 illustrate another embodiment of the present invention. The embodiment of camera support bracket includes a tubular main body portion 91 that is slidably received on the upper slide section 17 of FIG. 1, and an outwardly extending leg portion 93 which is secured to the main body portion 91 by means of conventional fasteners 99. A camera support shelf 95 is pivotably mounted to the outwardly extending leg portion 93 as at 101, about where shown in FIG. 8.

Longitudinally disposed within the main body portion 91 is a tubular member 97, preferably of plastic through which the upper slide section 17 passes.

The camera support shelf 95, as shown in FIG. 16, is angular in cross section and may be made of aluminum or any other suitable material. Located about where shown in FIG. 8, there is a conventional detent 103 that coacts with a hole 105 near one end of the support shelf 95. The support shelf 95 also has another hole 107 near the other end, as shown in FIG. 8.

The top of the shelf 95, as shown in FIG. 14, has an elongate slot 109 having at one end an enlarged circular-shaped opening 110. The width of the slot 109 is large enough to allow a camera-holding thumb screw 112 to slide longitudinally therein. The circular-shaped opening 110 is large enough to pass the thumb screw 112 when it is partly threaded into the camera body 81. Then, the camera may be mounted to the shelf by moving it to a desired position and tightening the thumb screw 112.

As shown in FIGS. 8-11, the main body portion 91 carries, pivotally mounted thereto as at 113, an elongate planar member 115 to which is fastened, top and bottom, a leather or plastic hand strap 117 with or without a buckle 119, as preferred, for adjusting the strap to fit the photographer's hand.

The elongate planar member 115 and the main body portion 91 have a coacting detent and hole 116 to hold the hand strap 117 and the member 115 in one position, but the elongate member 115 can pivot about the pin 113 when desired for more comfortable holding of the camera support device 91 on the upper slide section 17.

Figure 9:
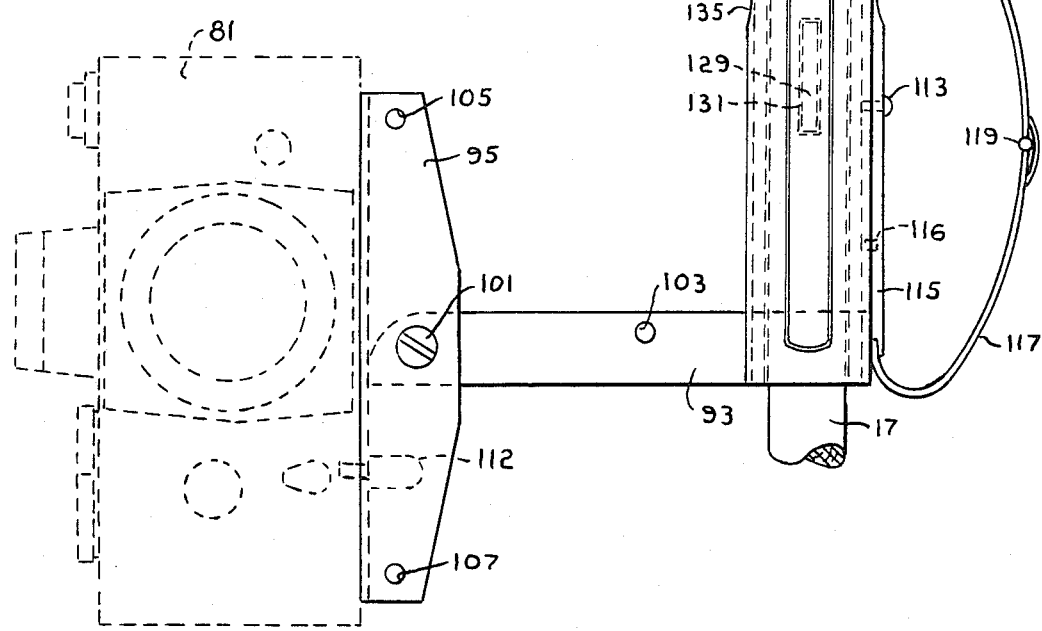
FIG. 9 is a schematic view of the camera support of FIG. 8, but showing it in another operative position.

Referring to FIGS. 8-11 and 13, the main body portion 91 is provided with a longitudinal slot 121 in which is pivotally disposed an elongate bar 123 that is pivotable about a pin 125 in the main body portion 91 about where shown in FIGS. 8,9, 13. Adjacent the top of the elongate bar 123 and about where shown in FIGS. 8,9 there is a thumb screw 127. The thumb screw 127 is threaded through the elongate bar 123 and, when it is tightened, bears against the tubular member 97, thereby pivoting the elongate bar 123 and causing it to engage the slide section 17 to secure the camera support bracket in a selected position along the slide section 17.

About midway along the length of the elongate bar 123 is a protruding portion thereof 129 which extends vertically, as shown in FIGS. 8,9, and which protrudes through a slot 131 in the tubular member 97. When the elongate bar 123 is pivoted by pressing thereon, it is the protruding portion 129 that contacts the upper slide section 17 to secure the support bracket in selected positions. The face of the protruding portion 129 that contacts the upper slide section may be covered with leather or other material to increase the frictional hold on the upper slide section. Numeral 133 refers to the covering.

Referring to FIGS. 8,9 and 11, the periphery of the main body portion 91 and the base member 115 may be recessed, as at 135 on one side (FIGS. 8,9), and at 137 in the base member 115; a thumb rest 139 (FIG. 11) is provided to suit the photographer's hand as he holds the camera bracket 89.

In using the embodiment of the invention disclosed in FIGS. 8-16, a photographer first mounts the camera to the camera support shelf by partly threading the thumb screw 112 into the conventional threaded hole in the camera body base, and then passing the thumb screw 112 through the hole 110. The photographer then slides the camera along the shelf 95 to a selected location. At such position, he thightens the thumb screw 112 to secure the camera on the support shelf 95. The upper slide section 17 is then extended to a desired length and the clamping device is tightened to secure it in place. The upper end of the slide section 17 is inserted and passes through the tubular main body portion 91. The camera support bracket 89 may be arrested manually at any selected location by manually pressing the elongate bar 123 with the photographer's fingers, or it may be arrested and secured in such position by tightening the screw 127.

When the camera is removed from the shelf 95, the thumb screw 112 may be stowed for further use by threading it into the hole 107, or into another hole (not shown) in the shelf 95.

Referring to FIG. 8, the camera is shown in position to take a horizontal format picture when the bracket is held by a right handed person. Pressing down on the left hand end of the shelf 95, as shown in FIG. 8, the shelf 95 will pivot about the screw 101 and assume the position shown in FIG. 9, which is the position to take a vertical format picture.

When the photographer uses the support device shown in FIGS. 8, 9, his left hand passes through the loop of the strap 117 and the fingers of his left hand grasp the elongate bar 123, while his left thumb rests in the depression 139. Then, by releasing the elongate bar 123, the camera support shelf and the camera may be moved up or down on the upper slide section 17 as desired. The right hand of the photographer is free to manipulate the camera controls at all times. Should it be desirable to take a vertical format picture, the photographer's right hand merely presses down on the end of the shelf 95 and it quickly assumes the position shown in FIG. 9, and the right hand is still free to manipulate the camera controls.

When the camera support device is elevated above the head of the photographer, it is more comfortable to use the device by pivoting the elongate planar member 115 about the pivot pin 113.

FIGS. 17, 18 illustrate one form of electronic flash gun support that may be fitted to the embodiment of the invention shown in FIGS. 8, 9.

The tubular member 97 has a length greater somewhat than that shown in FIG. 1 so that three projections 141 provided thereon about where shown at FIGS. 17 and 18 cooperate with an octagonal shaped cap 143 that has three corresponding openings 145. The cap 143 fits down over the projections 141 and then is twisted clockwise so as to lock the cap in position, which, in effect, is a bayonet type of mount. The fit between the octagonal cap 143 and the projections 141 holds the cap in position.

The octagonal cap 143 has an outwardly projecting arm 147 that has a conventional shoe 149 that receives the conventional T-shaped foot on the bottom of a conventional flash gun.

FIG. 19 illustrates another form of support for a conventional flash gun as fitted to the angle-shaped base member 45 of FIGS. 1-2, the top being flanged as at 45a. On the flange portion 45a, the conventional shoe 149 is attached.

From the foregoing description of embodiments of the invention, those skilled in the art will recognize many features and advantages, among which the following are significant:

That the camera support is light in weight, easy to set up and adjust, and is quickly adaptable to suit the needs of many photographers;

That the camera support may be quickly and easily raised and lowered, as conditions warrant, to suit the needs of most photographers;

That the camera support bracket may be arrested manually at any desired position, and then quickly and easily raised or lowered on the upper slide section;

That the camera support bracket may be quickly and easily fixed in a desired position on the upper slide section;

That the camera support, with camera attached to the bracket, may be tilted through an infinite number of angles from a vertical through the ground support of the camera support;

That the upper slide section, with camera and support bracket mounted thereon, may be used solely when photographing objects at ground level;

That by mounting the camera support bracket in the inverted position on the upper slide bracket when it is extended full length, a picture may be taken at a level well above the head of the photographer;

That the camera support bracket may be used solely and a camera mounted thereon may be easily and quickly positioned for a vertical format picture and for a horizontal format picture;

That the camera support of the invention is provided with a support for a conventional flash gun; and That the camera support device is simple to construct and is not costly.

Although the foregoing describes embodiments of the present invention, it is understood that modifications may be made therein without departing from the scope thereof as set forth in the following claims.

What is claimed is:

1. A camera support comprising:
(a) a first elongate member;
(b) a second elongate member so constructed and arranged as to slide longitudinally in association with said first elongate member;
(c) means for extending and arresting said second elongate member in selected positions relative to said first elongate member;
(d) a camera support device comprising a first arm and a second arm angularly carried by said first arm;
(e) means for mounting said camera support device on said second elongate member in such a manner that a camera mounted thereon is positioned to take a horizontal format picture;
(f) means for mounting said camera support device on said second elongate member in such a manner that a camera mounted thereon is positioned to take a vertical format picture; and
(g) means for positioning and releasably holding said camera support device on said elongate second member.

2. The camera support of claim 1 wherein:
(a) said first and second elongate members are each tubular and are affixed to each other in such a way that said first elongate member is slidable over said second elongate member.

3. The camera support of claim 2 including:
(a) a support for a conventional flash gun carried by one of said elongate members.

4. The camera support of claim 1 wherein:
(a) said means for positioning and releasably holding said camera support device on said second elongate member includes clamping means so constructed and arranged that when said clamping means is tightened, said camera support device is held in selected positions on said second elongate member; and
(b) said means for arresting said first and second elongate members in selected relative positions is a clamp.

5. The camera support of claim 1 wherein:
(a) said first elongate member is a tubular structure; and
(b) said second elongate member is a rod slidably disposed in said tubular structure.

6. A camera support comprising:
(a) an angle-shaped base member having two leg portions;
(b) means on one of said leg portions for supporting a camera thereon;
(c) a tubular member fixed longitudinally to each one of said leg portions, each tubular member being slotted longitudinally and having a peripheral groove;
(d) first clamping means associated with each peripheral groove;
(e) an elongate tubular first member having longitudinal slots in one end portion so constructed and arranged that the slotted end portion of said tubular first member is radially deformable when pressure is applied to said slotted end portion;
(f) a peripheral groove in said slotted end portion;
(g) second clamping means associated with said peripheral groove in said slotted end portion for exerting pressure on said slotted end portion;
(h) an elongate second member slidably associated with and extendable relative to said first tubular member;

(i) one end portion of said second elongate member being slidably disposed in one of said tubular members fixed to a respective leg of said angle-shaped base member;

(j) means for actuating said first clamping means in such a way that said angle-shaped base member is realeasably secured to said elongate second member at selected positions therealong; and (k) means for actuating said second clamping means in such a way that said elongate second member is releasably secured in extended positions relative to said elongate tubular first member.

7. The camera support of claim 6 wherein:
(a) said first and second clamping means are screw clamps.

8. The camera support of claim 6 further comprising:
(a) indicating means on one end portion of said elongate second member for determining when said elongate second member is close to being entirely withdrawn from said elongate tubular first member.

9. The camera support of claim 6 including:
(a) strap handle means fixed to one leg of said base member.

10. The camera support of claim 6 further comprising:
(a) means for closing the other end portion of said elongate tubular first member.

11. A camera support comprising:
(a) a base member having means thereon for supporting a camera;
(b) means on said base member for slidably receiving an elongate member in such a manner that said base member is carried by said elongate member; and
(c) means on said base member for releasably arresting and for securing said base member at selected positions along said elongate member; wherein said base member is angle-shaped such as to form a pair of legs and each of said legs has means for slidably receiving said elongate member.

12. The camera support of claim 11 wherein:
(a) said releasably arresting and securing means includes clamping means.

13. A camera support device comprising:
(a) a main body member;
(b) a leg member outwardly extending from said main body member;
(c) a camera support shelf pivotally mounted to said leg member;
(d) means for mounting a camera in selected positions on said support shelf;
(e) means for holding said support shelf in a predetermined operative position relative to said leg member whereby said support shelf is free to pivot from said predetermined operative position to other operative positions relative to said leg member;
(f) an elongate member slidably mounted to said main body member;
(g) a hand strap secured to said main body member in such a manner as to enable said camera support device to be securely hand held with said elongate member disconnected from said main body member; and
(h) means for releasably securing said elongate member in selected operative positions relative to said main body member when said main body member and said elongate member are joined.

14. The camera support device of claim 13 wherein:
(a) said means for mounting a camera on said support shelf includes;

(i) an elongate slot extending lengthwise of said support shelf, said slot having an opening at one end thereof, and
(ii) thumb screw means partially threaded into a hole in the base of said camera, whereby said camera is releasably mounted to said support shelf by passing said thumb screw means through said opening, sliding said camera along said slot and tightening said thumb screw means.

15. The camera support device of claim 13 wherein:
(a) said leg member is removably mounted to said main body member, and
(b) said means for holding said support shelf includes a detent in said leg member that is cooperative with said support shelf.

16. The camera support device of claim 13 further comprising:
(a) means on said main body member for releasably mounting a conventional flash gun.

17. The combination comprising:
(a) a first elongate member;
(b) a second elongate member slidably associated with said first elongate member;
(c) means for extending said second elongate member from said first elongate member;
(d) means for securing said second elongate member in selected positions relative to said first elongate member;
(e) a camera support slidably carried by said second elongate member and comprising:
(i) a main body member so constructed and arranged that it is slidable and releasably positioned on said second elongate member,
(ii) a leg member outwardly extending from said main body member,
(iii) a shelf pivotally mounted to said leg member,
(iv) means for mounting a camera in selected positions on said shelf,
(v) means for holding said shelf in one predetermined operative position relative to said leg member, whereby said shelf is free to pivot from said predetermined operative position to other operative positions relative to said leg member; and
(f) means for releasably arresting and for securing said camera support in selected locations on said second elongate member, said last mentioned means comprising:
(i) an elongate bar disposed in a longitudinal slot in said main body member and having a protrusion directed toward and engageable with said second elongate member,
(ii) means for pivoting said bar in said slot whereby said bar is manually operable for pivoting said bar and causing said protrusion to engage said second elongate member whereby said camera support is arrested and held in a selected position on said second elongate member, and
(iii) a thumb screw threaded into said bar in such a manner that when said thumb screw is tightened, said bar pivots for causing said protrusion to engage said second elongate member and said camera support is arrested and held in a selected position on said second elongate member.

18. The combination of claim 17 further comprising:
(a) means on said main body member for releasably supporting a conventional flash gun.

19. The combination of claim 17 further comprising:
(a) means on an end of said first elongate member for releasably supporting a conventional flash gun.

* * * * *